US008341799B2

(12) United States Patent
Koppen et al.

(10) Patent No.: US 8,341,799 B2
(45) Date of Patent: Jan. 1, 2013

(54) MULTIFUNCTION WIPER BLADE CONNECTOR AND ASSEMBLY

(75) Inventors: Scott Allen Koppen, Dexter, MI (US); Xavier Boland, Arlon (BE)

(73) Assignee: Federal-Mogul Corporation, Southfield, MI (US)

( * ) Notice: Subject to any disclaimer, the term of this patent is extended or adjusted under 35 U.S.C. 154(b) by 358 days.

(21) Appl. No.: 12/832,134

(22) Filed: Jul. 8, 2010

(65) Prior Publication Data
US 2011/0005020 A1 Jan. 13, 2011

Related U.S. Application Data

(60) Provisional application No. 61/224,591, filed on Jul. 10, 2009.

(51) Int. Cl.
*B60S 1/02* (2006.01)
(52) U.S. Cl. .............. 15/250.32; 15/250.201; 15/250.44
(58) Field of Classification Search ............... 15/250.32, 15/250.351, 250.361, 250.201, 250.43, 250.44, 15/250.46; 403/3, 4, 321
See application file for complete search history.

(56) References Cited

U.S. PATENT DOCUMENTS

| | | | |
|---|---|---|---|
| 4,963,717 A | 10/1990 | Woelfle | |
| 5,084,933 A | 2/1992 | Buechele | |
| 5,289,608 A | 3/1994 | Kim | |
| 5,332,328 A | 7/1994 | Yang | |
| 5,392,487 A | 2/1995 | Yang | |
| 5,611,103 A | 3/1997 | Lee | |
| 5,632,059 A | 5/1997 | Lee | |
| 5,807,016 A | 9/1998 | Herring et al. | |
| D404,354 S | 1/1999 | Witek et al. | |
| 5,885,023 A | 3/1999 | Witek et al. | |
| 5,937,474 A | 8/1999 | Hussaini | |
| D418,474 S | 1/2000 | Witek et al. | |
| 6,161,249 A | 12/2000 | Hussaini | |
| 6,332,236 B1 | 12/2001 | Ku | |

(Continued)

FOREIGN PATENT DOCUMENTS

KR 100678408 B1 2/2007

(Continued)

*Primary Examiner* — Brian Glessner
*Assistant Examiner* — Patrick Maerstri
(74) *Attorney, Agent, or Firm* — Robert L. Stearns; Dickinson Wright, PLLC

(57) ABSTRACT

A universal connector (100) is adapted to connect a wiper blade assembly (20, 102) with a variety of wiper arm ends (300, 302, 304, 306, 308, 310, 312, 314, 316). In order to connect side pin type wiper arm ends (302, 304, 306), the connector includes a pin hole (216) having a figure "8" shape defined by larger and smaller overlapping lobes (218, 220). A flexible tongue (222) carried by the connector (100) includes a pair of scalloped pawls (224, 226) aligned with the respective larger and smaller lobes (218, 220) so as to engage either a ¼" or 3⁄16" wiper arm side pin (302-306). In order to connect wiper arm ends having hook slots (310, 312, 314 316), the connector (100) includes a generally planar upper landing (204), a generally planar lower return (206), and a forward nose profile (208). Sides (210) include cantilevered extensions (212) projecting beyond the nose profile (208) and which carry a pair of 9×4 stops (214) set below the plane of the lower return (206) by a clearance gap. When assembling a 9×3 hook end (316), the 9×4 stop (214) is bypassed entirely due to the clearance gap. However, when a 9×4 hook arm (310, 312, 314) is used, the 9×4 stops (214) retain the hook arm (310, 312, 314) in position.

18 Claims, 10 Drawing Sheets

U.S. PATENT DOCUMENTS

| | | | |
|---|---|---|---|
| 6,539,576 B2 | 4/2003 | Kim | |
| 6,591,445 B2 | 7/2003 | Nacamuli | |
| 6,640,380 B2 * | 11/2003 | Rosenstein et al. | 15/250.32 |
| 6,779,223 B1 | 8/2004 | Roekens | |
| 7,055,207 B2 | 6/2006 | Coughlin | |
| 7,207,082 B2 | 4/2007 | Lee | |
| 7,316,047 B2 * | 1/2008 | Thienard | 15/250.32 |
| 7,341,396 B2 | 3/2008 | Huang | |
| 7,481,596 B2 | 1/2009 | Thienard | |
| 7,584,520 B2 | 9/2009 | Hussaini et al. | |
| 2002/0174504 A1 | 11/2002 | Kim | |
| 2003/0066153 A1 | 4/2003 | Rosenstein et al. | |
| 2008/0086830 A1 | 4/2008 | Kim | |

FOREIGN PATENT DOCUMENTS

| | | |
|---|---|---|
| KR | 100894436 B1 | 4/2009 |

* cited by examiner

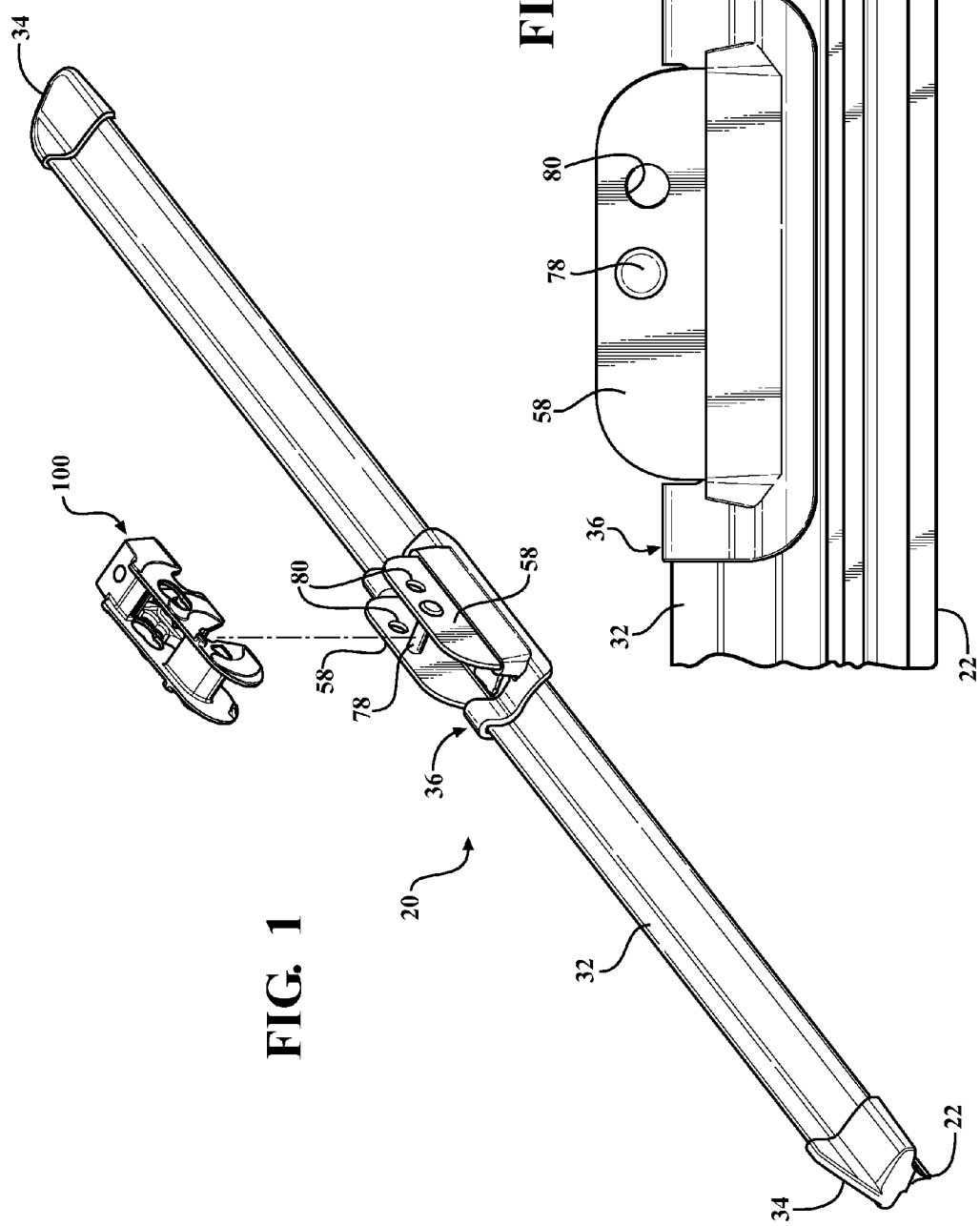

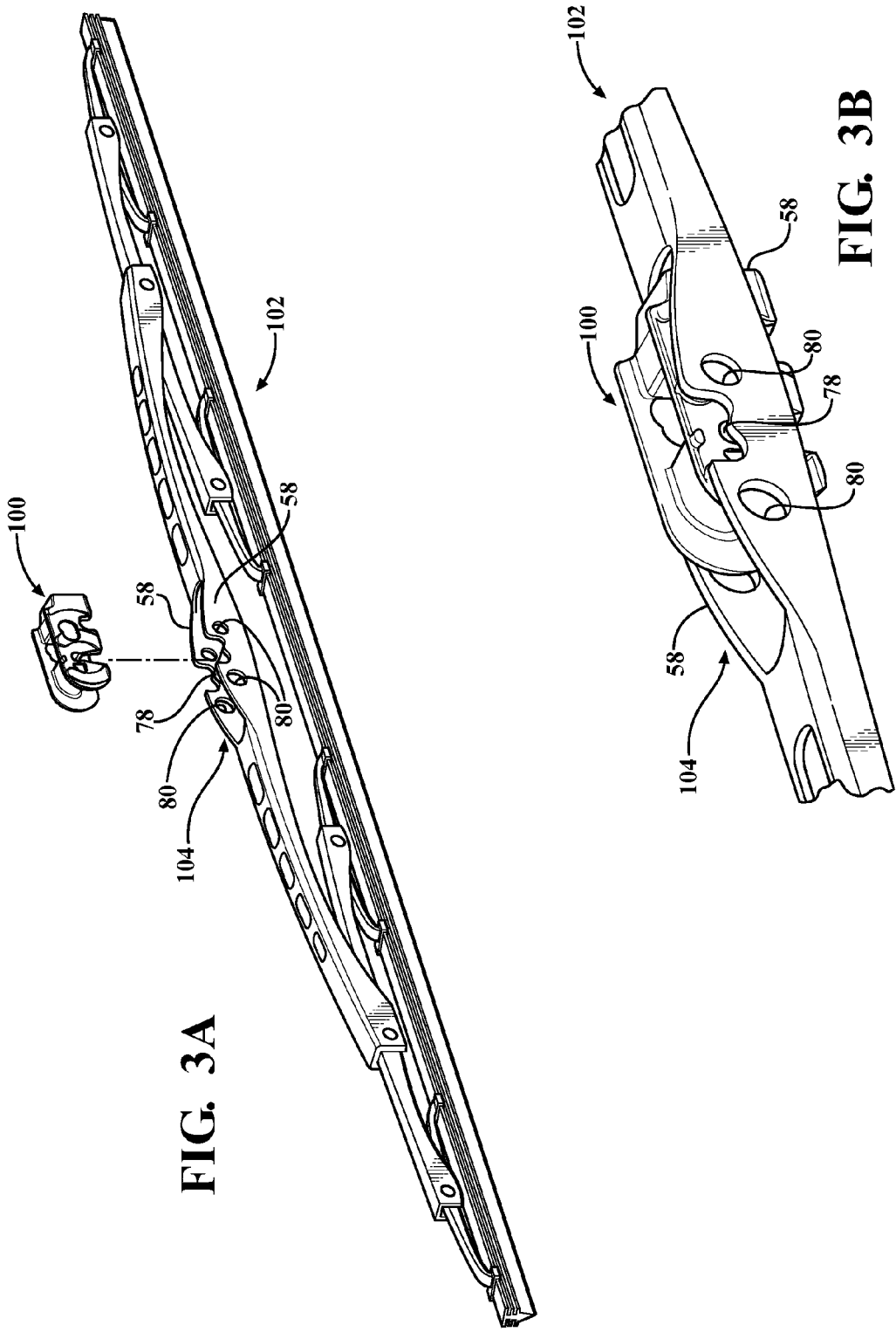

MULTIFUNCTION WIPER BLADE CONNECTOR AND ASSEMBLY

CROSS REFERENCE TO RELATED APPLICATIONS

This application claims priority to U.S. Provisional Patent Application No. 61/224,591 filed Jul. 10, 2009, the entire disclosure of which is hereby incorporated by reference and relied upon.

BACKGROUND OF THE INVENTION

1. Field of the Invention

A wiper blade assembly of the type used for clearing water from a windshield or windscreen, and more particularly toward an improved connector for joining a wiper blade to any one of various style wiper arm ends including side pin and/or hook slot styles.

2. Related Art

Windshield wipers are used to remove water from the windshield or windscreen of motor vehicles and in related applications. In a typical wiper assembly, a wiper blade connects to the free end of an oscillating or sweeping wiper arm through a central connection device, known as a connector. The connector is usually clipped onto the top side of the wiper blade, generally midway along its length.

Traditionally, the free sweeping end of wiper arms are configured in one of several recurring styles which include pin-type arms, hook slot arms and straight arms. Each arm end style has a different technique for attaching (and detaching) with the connector. For example, a wiper blade assembly is connected to a pin-type arm by inserting a transverse pin through a side hole in the connector. Hook slot style arms are attached by sliding the hook over the connector until a tab or flexible tongue of the connector automatically locks in the so-called din slot of the hook. Straight arm style arm ends are typically attached by sliding the straight arm into the connector until a small stud locks in place. Each type of wiper arm end may come in a variety of sizes. For example, pin-type arms typically are designed with either 3/16 or 1/4 inch diameter pins in the US, and in various metric sizes for the European markets. Hook type arms typically have hook bar thicknesses of 3 mm or 4 mm. The hook widths are commonly 9 mm, so that these two size classes are referred to as either 9×3 or 9×4 styles. The inside dimensions of a 9×3 style hook are typically smaller than the corresponding inside dimensions of a 9×4 style hook.

For replacement blade sales, the connector must be able to accommodate several, or more preferably all, of these arm end styles and sizes. Much attention has therefore been given to the configuration of the connector, together with the method in which it is fixed to the wiper blade. Another concern is the robustness of the connector. The connector is largely exposed to the environment and if damaged may lead to unintended disconnection of the wiper blade. For example, impact by a foreign object such as a stone thrown by a passing car or an ice scraper can conceivably cause the connector to release its otherwise secure engagement with the wiper blade, resulting in unexpected disassembly from the wiper arm.

Another disadvantage inherent in prior art connector designs resides in the self-locking retention features used by 9×3 and 9×4 hook ends on a wiper arm. Typically, in order to install a new wiper blade to a hook style wiper arm, and to remove same, the wiper blade must be rotated to a "service up" position where the wiper blade body is placed substantially perpendicular to the wiper arm. Only in this service up position can the wiper blade be installed or removed from a hook style arm due to self-locking stop features incorporated into the connector. It will be appreciated that not all vehicle wiper assemblies include a convenient service up position and therefore changing the wiper blades on hook style arms can be difficult.

Therefore, there is a need in this art for an improved connector between the wiper blade and wiper arm which will adapt to a variety of arm end designs without need of auxiliary adaptors, without requiring a service up position for some hook style arm configurations, and which is not susceptible to damage if impacted by a foreign object such as thrown stone or an over-zealous ice scraper.

SUMMARY OF THE INVENTION

According to a first aspect of this invention, a connector is provided for joining a wiper blade to any one of various style wiper arm ends. The connector comprises a central body section including a rivet-receiving socket, a generally planar upper landing, a generally planar lower return and a forward nose profile extending between the upper landing and the lower return. A pair of sides interconnect the central body section on respective inside faces thereof. The sides include cantilevered extensions projecting beyond the nose profile. A 9×4 stop is disposed on the inside face of the cantilevered extension of at least one side and is set below the plane of the lower return by a clearance gap. Each side further includes a transversely extending pin hole adapted to receive wiper arm side pins of different diameters. A flexible tongue extends from the central body section and is disposed between these sides. The tongue includes at least one pawl disposed generally between the pin holes for engaging a wiper arm side pin, and also a tooth for engaging a din slot recess in a wiper arm hook.

A connector according to this invention provides a convenient attachment point for a variety of wiper arm end designs without the need for auxiliary or supplemental adapter components. When attaching some hook style arm configurations, the connector does not require the blade to be placed in a service up condition. Furthermore, the connector of this invention can be implemented as a low profile design which is resistant to impact damages and therefore securely retains the wiper blade to the wiper arm.

According to another aspect of this invention, a wiper assembly is provided for accommodating any one of various size side-pin style wiper arms. The wiper assembly comprises a wiper blade including a wiping element and a bridge portion providing a point of connection to an oscillating wiper arm. The bridge portion includes a pair of spaced-apart ears, a rivet extending transversely between the ears, and at least one through-hole offset from the rivet and extending in aligned fashion through the pair of ears. A wiper arm is provided having a free swinging end including a transversely extending side pin. A connector interconnects the bridge portion of the wiper blade to the side pin of the wiper arm. The connector includes a central body section having a rivet-receiving socket and a pair of sides interconnected by the central body section on respective inside faces thereof. Each side includes a transversely extending pin hole adapted to receive wiper arm side pins of different diameters. The connector further includes a flexible tongue extending from the central body section and disposed between the sides. The tongue includes at least one pawl disposed generally between the pin holes for engaging a wiper arm side pin in locked engagement to be retained against its connection from the wiper blade.

According a further aspect of this invention, a wiper assembly is provided for alternatively accommodating 9×3 and 9×4 hook style wiper arms. This assembly comprises a wiper blade including a wiping element and a bridge portion providing a point of connection to an oscillating wiper arm. The bridge portion includes a pair of spaced-apart ears, a rivet extending transversely between the ears, and at least one through-hole offset from the rivet and extending in aligned fashion through the pair of ears. The wiper arm has a free swinging end including a hook formation comprising either a smaller 9×3 style or a larger 9×4 style. A connector is provided for interconnecting the bridge portion of the wiper blade to the hook formation of the wiper arm. The connector includes a central body section. The central body section includes a rivet-receiving socket, a generally planar upper landing, a generally planar lower return and a forward nose profile extending between the upper landing and the lower return. The connector also includes a pair of sides interconnected by the central section on respective inside faces thereof. The sides include cantilevered sections projecting beyond the nose profile. A 9×4 stop is disposed on the inside face of the cantilevered extension of at least one side and is set below the plane of the lower return by a clearance gap. A flexible tongue extends from the central body section and is disposed between the sides. The tongue includes a tooth for engaging the din slot recess in a 9×3 wiper arm hook.

BRIEF DESCRIPTION OF THE DRAWINGS

These and other features and advantages of the present invention will become more readily appreciated when considered in connection with the following detailed description and appended drawings, wherein:

FIG. 1 is a perspective view of an exemplary flat-type wiper blade assembly with a connector according to the subject invention exploded therefrom;

FIG. 2 is an enlarged, fragmentary side view of the bridge portion of the blade assembly shown in FIG. 1;

FIG. 3A is a perspective view of an alternative frame-type wiper blade assembly with a connector according to the subject invention and exploded therefrom;

FIG. 3B is an enlarged, fragmentary perspective view of the bridge portion of the wiper blade assembly shown in FIG. 3A with the connector attached thereto in an operative position;

FIG. 12A depicts a standard length 9×4 hook, FIG. 12B depicts a short length 9×4 hook, and FIG. 12C depicts a long length 9×4 hook;

DETAILED DESCRIPTION OF THE PREFERRED EMBODIMENT

Figure 4:
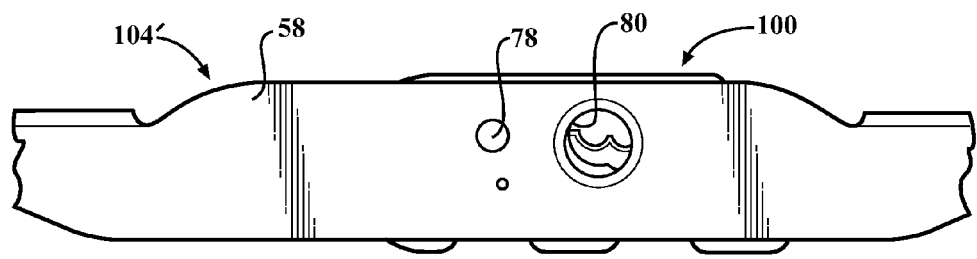
FIG. 4 is a fragmentary side view of a further alternative bridge portion of a wiper blade assembly adapted for use with ¼ inch side pin style wiper arms.

Referring to the figures, wherein like numerals indicate like or corresponding parts throughout the several views, one style of windshield wiper blade assembly is generally shown at 20 in FIGS. 1 and 2. The wiper blade assembly 20 illustrated here is of the so-called flat or yokeless type having an elongated wiper element 22 adapted for direct contact against the windshield of a motor vehicle to scrape water and snow from the windshield as the blade assembly 20 is swept back and forth in an oscillating, repetitive pattern. Spoilers 32 may be attached to the wiper blade assembly to help maintain an even pressure of the wiper element 22 against a windshield during high driving speeds. End caps 34 snap-connect in place and surround the outermost ends of each spoiler 32 to establish a finished, terminal end piece.

A bridge piece or portion 36 may be constructed in accordance with the illustrations and descriptions provided in U.S. Pat. No. 7,523,533, the entire disclosure of which is incorporated here by reference. A metallic rivet 78 is fixed crosswise between upstanding ears 58 of the bridge 36. Aligned through-holes 80 are spaced a short distance from the rivet 78. A universal connector, generally indicated at 100, is adapted to snap-fit over the rivet 78. The universal connector 100 forms the basis for connecting to a variety of arm end styles, including hook-shaped wiper arms, side pin style wiper arms, and straight end style wiper arms, as well as various European pin style fittings.

FIGS. 3A and 3B generally depict an alternative frame type or yoke type wiper blade assembly 102. In these examples, the bridge portion 104 supports a rivet 78 and one or more through-holes 80 as in the preceding examples. The ears 58 in this example are integrated into the frame of the blade assembly 102.

Figure 5:
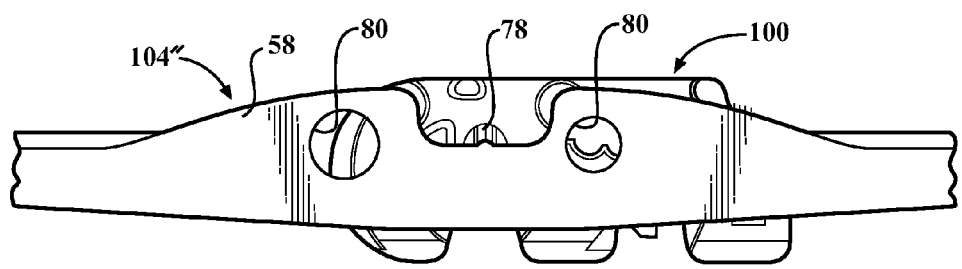
FIG. 5 is a fragmentary side view of another bridge portion configuration adapted for either ¼" side pin or ¾" side pin connections with a connector according to this invention attached thereto in the position designed for an attachment of a 3⁄16" side pin style wiper arm.
Figure 6:
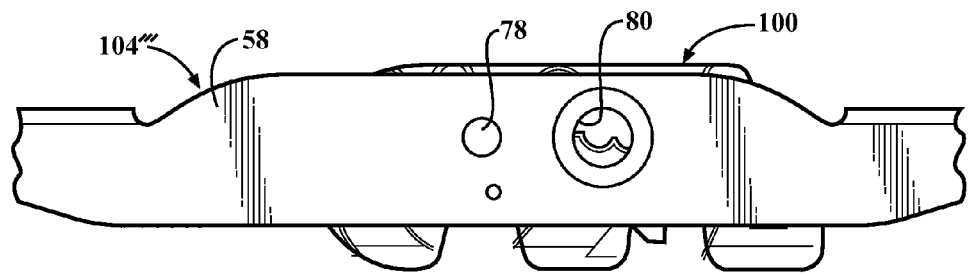
FIG. 6 is a side view of a still further bridge portion of a wiper blade assembly designed for connection with 3⁄16" style side pin wiper arms together with a connector according to the subject invention operatively attached thereto.

The universal connector 100 is adapted to cooperate with any style wiper blade assembly 20, 102 by attaching directly to the rivet 78. A more detailed description of the method by which a connector attaches to the rivet 78 may be found in U.S. Pat. No. 5,807,061 issued Sep. 15, 1998, the entire disclosure of which is hereby incorporated by reference. FIGS. 4-6 illustrate still further alternative bridge configurations for wiper assemblies for which a connector 100 according to this invention will readily attach for purposes of joining a wiper arm. FIG. 4 shows a bridge style 104' adapted to receive one or more hook style arm ends together with a ¼" side pin type arm end. FIG. 5 shows a different bridge style 104" adapted to receive either ¼ or 3⁄16" side pin arm ends, depending on which way the connector 100 is attached to the rivet 78. FIG. 6 shows a bridge style 104''' adapted to 3⁄16" side pin arm types. The ears 58 are indicated for each design, together with through-holes 80.

Figure 7:
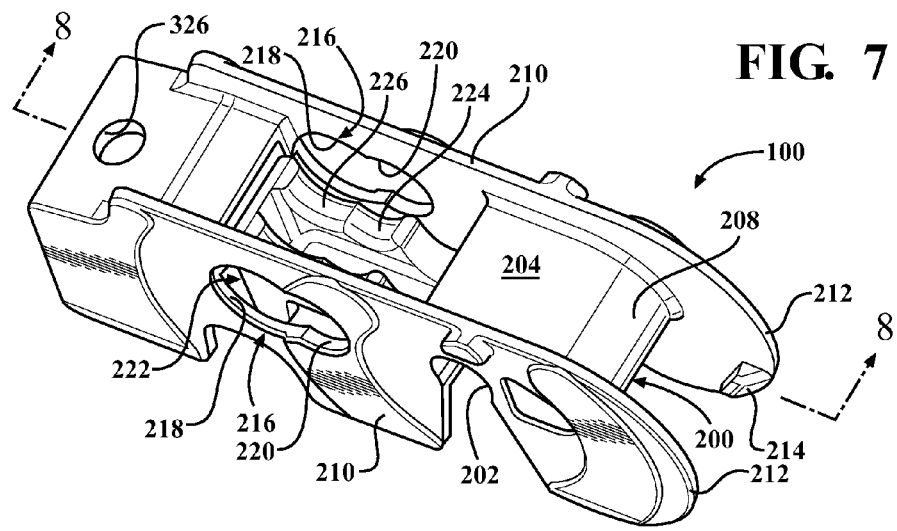
FIG. 7 is a perspective view of the subject connector.
Figure 8:
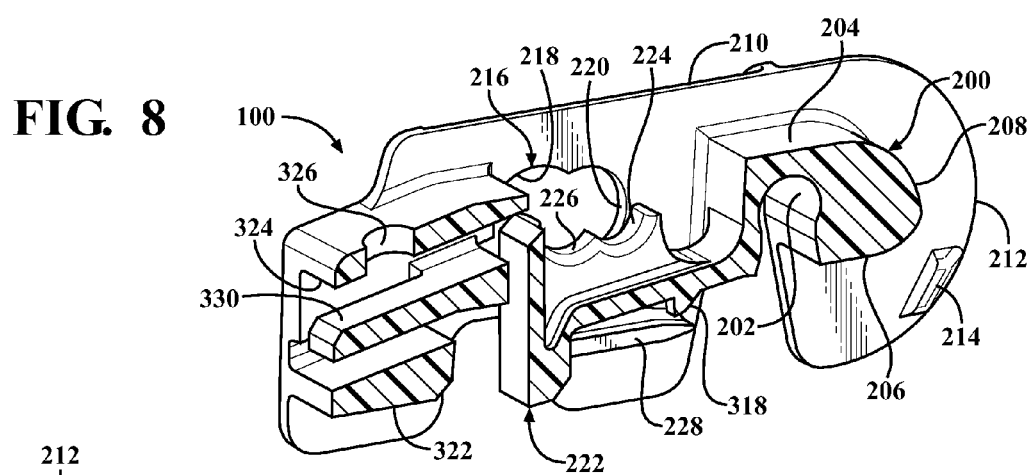
FIG. 8 is a cross-sectional view taken generally along line 8-8 in FIG. 7.
Figure 9:
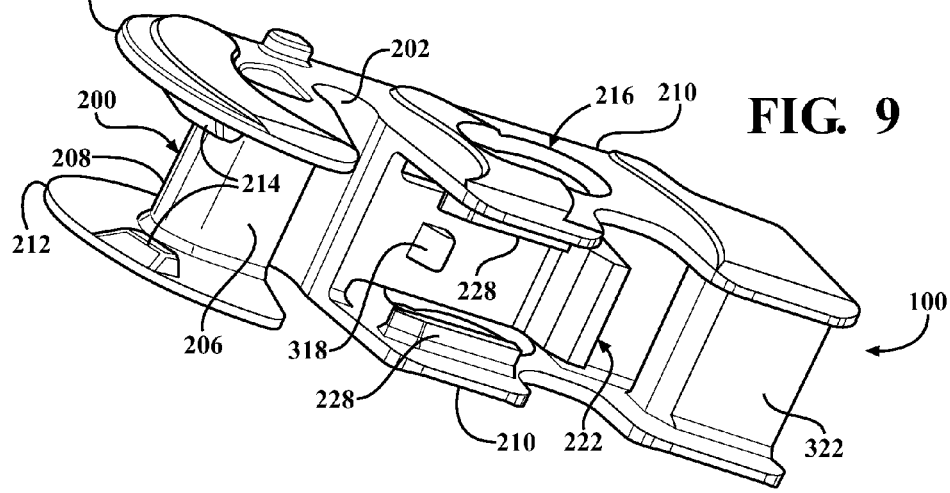
FIG. 9 is a bottom perspective view of the subject connector.

FIGS. 7-9 provide various views of the subject connector 100 from different perspectives and also in a longitudinally sectioned view (FIG. 8). The connector 100 includes a central body section 200 in which a rivet-receiving socket 202 is formed. The rivet-receiving socket 202 has a key-hole shape that snap-locks to the rivet 78 via an interference-fit in its narrow throat area. The top region of the central body section 200 is formed by a generally planar upper landing 204. The bottom region of the central body section 200 is formed by a generally planar lower return 206, which is also generally parallel to the upper landing 204. A rounded forward nose profile 208 extends between the upper landing 204 and the lower return 206.

The connector 100 further includes a pair of sides 210. The sides 210 interconnect the central body section 200 on respective inside faces thereof. The sides 210 include cantilevered extensions 212 projecting beyond the nose profile 208. A 9×4 stop 214 is disposed on the inside face of the cantilevered extension 212 of at least one, but preferably both, sides 210. The 9×4 stops 214 are set below the plane of the lower return 206 by a clearance gap perhaps best shown in FIGS. 11A-C. In the preferred embodiment, the clearance gap is greater than or equal to 3 mm and less than about 4 mm, however dimensional variations may be introduced depending upon the application.

Each side 210 includes a transversely extending pin hole 216. As perhaps best shown in FIG. 7, the pin hole 216 may have a generally figure "8" shape composed of a larger lobe 218 and an overlapping smaller lobe 220. Intersection of the lobes 218, 220 is such that each lobe has an inner circumference greater than 180°. The larger lobe 218 is sized so as to receive a ¼" side pin on the free end of a wiper arm (FIG. 4), whereas the smaller lobe 220 is sized to receive a ³⁄₁₆" side pin (FIGS. 5 and 6), as will be described in greater detail below.

A flexible tongue 222 extends from the central body section 200 and is disposed between the sides 210. The tongue 222 includes at least one, but preferably two pawls 224, 226 disposed generally between the pin holes 216. The pawls 224, 226 are preferably, but not necessarily, scalloped to correspond with the shaft of a pin inserted through either of the larger 218 (FIG. 14C) or smaller 220 (FIG. 13C) lobes of the pin hole 216 and thereby engage and retain a side pin type wiper arm.

A 9×4 support rail 228 is disposed on the inside face of at least one, but preferably both sides 210. The 9×4 support rails 228, as best shown in FIGS. 8 and 9, are disposed below the plane of the lower return 206 by the clearance gap defined above. This clearance gap is evident in FIGS. 11B and 11C.

Figure 10:
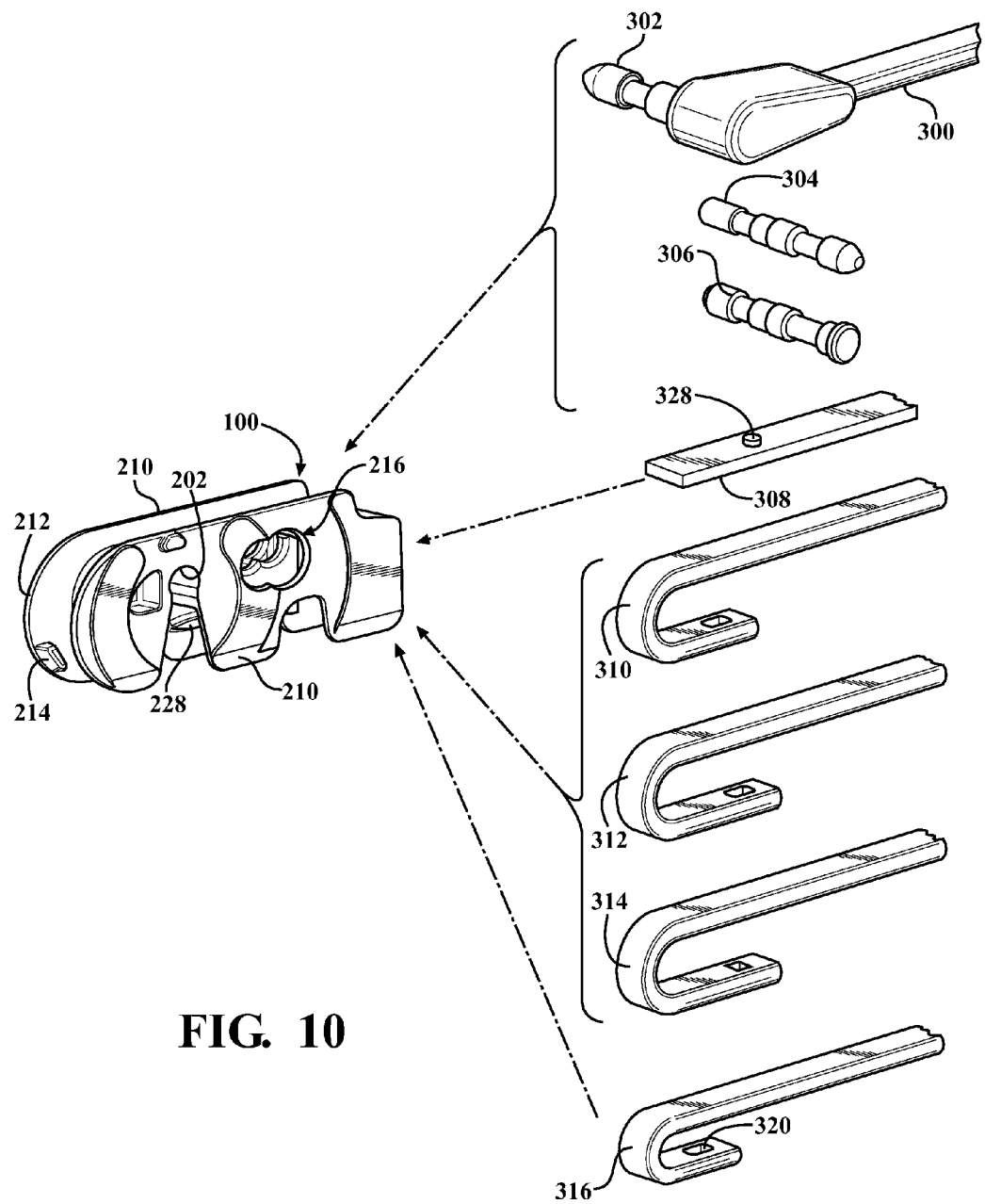
FIG. 10 is an illustrative view of a variety of wiper arm end styles that can be connected directly to the subject connector.

FIG. 10 shows the wide range of arm end styles to which the subject connector 100 will readily couple. These arm types are well known to those of skill in this field, with only a representative sample of possible configurations shown here. This includes a pin style arm end 300 having various diameter and shape pins 302, 304, 306; a straight end style 308; 9×4 hook ends of the short 310, long 312 and standard 314 length varieties; and a 9×3 hook end 316.

Figure 11A:
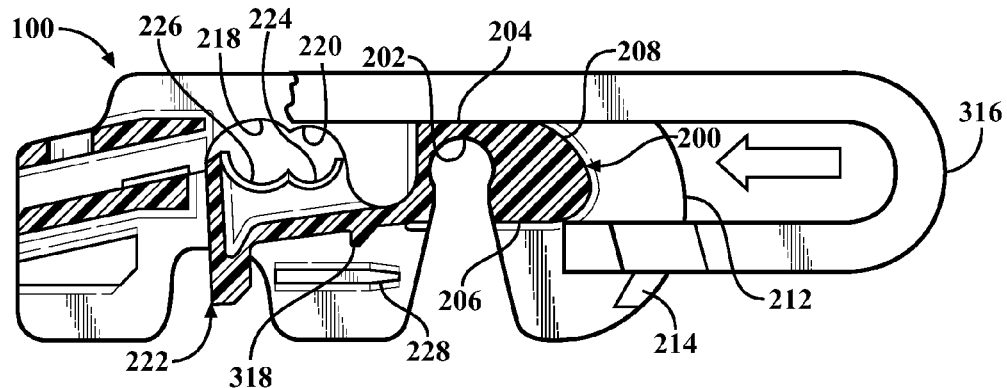
FIGS. 11A-11C depict the subject connector assembly in cross-section as a 9×3 hook end of a wiper arm is progressively connected thereto.
Figure 11B:
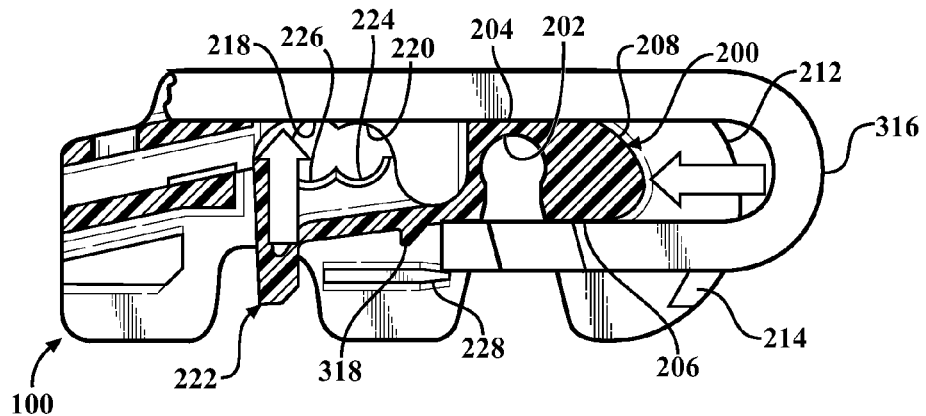
Figure 11C:
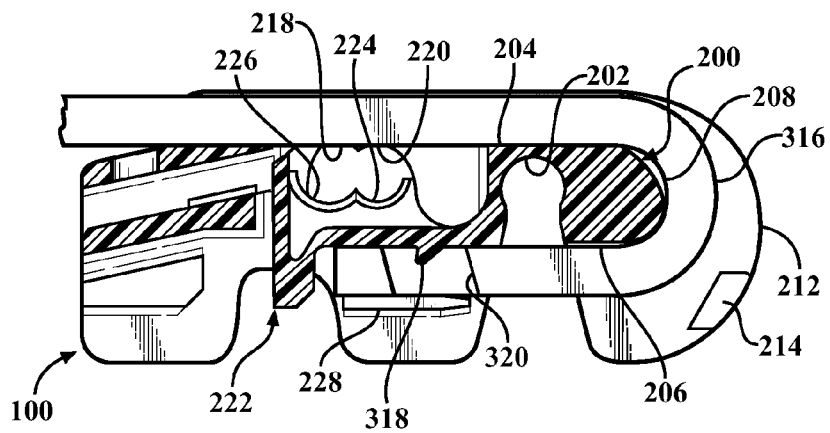

FIGS. 11A-C represent a series of illustrations showing the connector 100 in cross-section, with a 9×3 shepherd's hook style arm end 316 connected to the connector. This view illustrates how the 9×3 hook arm end 316 is hooked around the lower section of the nose profile 208 and slid into position until a shark's tooth 318 carried on the elastic tongue 222 seats in the rectangular recess or so-called din slot 320 formed in the distal end of the hook 316. As shown in the illustrations, the bight end of the hook 316 passes over top of the 9×4 stop 214 without disturbing the 9×4 stop 214 or causing the side 210 to flare outwardly. As a result, a 9×3 hook arm 316 can be attached to the connector 100 without the wiper arm being placed in a service up condition. This makes installation of a wiper blade assembly 20, 102 to a 9×3 hook arm 316 more convenient than in prior art arrangements.

Figure 12A:
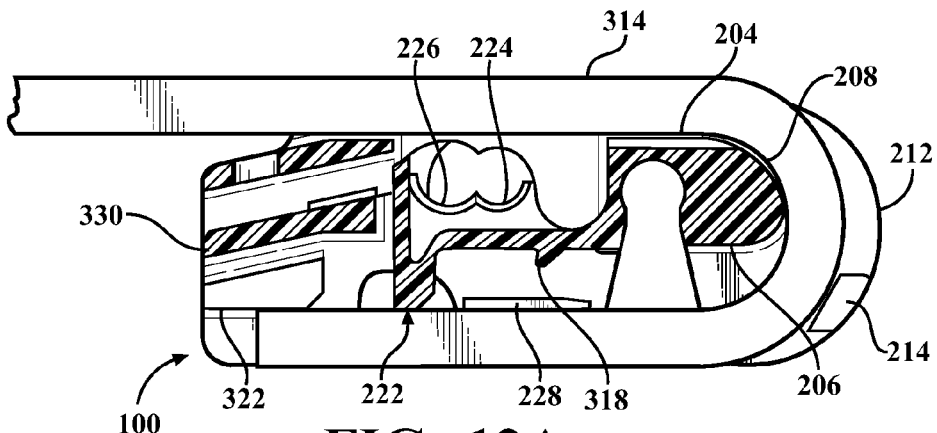
FIGS. 12A-12C show the subject connector in cross-section with 9×4 hook style wiper arm ends fully connected thereto, where
Figure 12B:
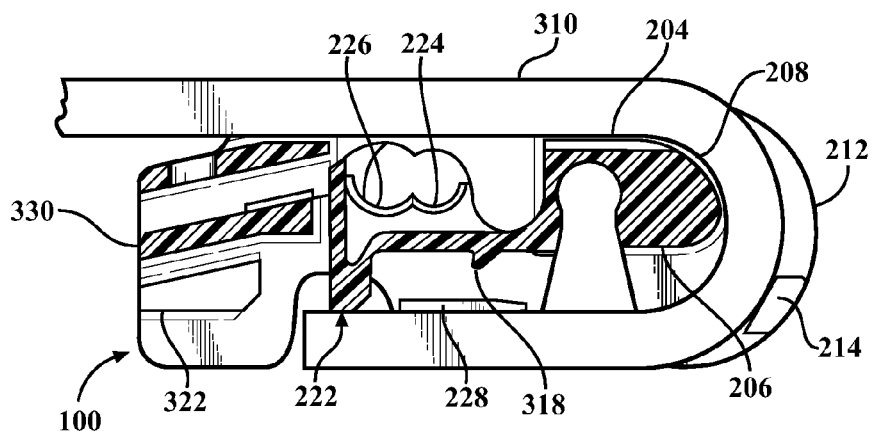
Figure 12C:
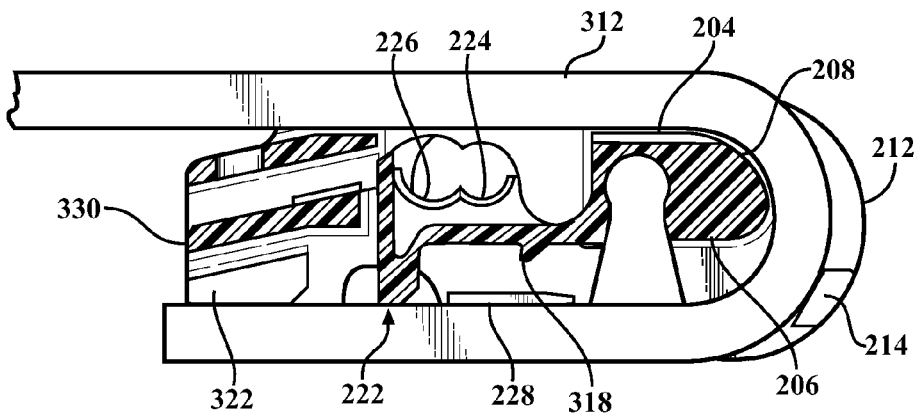

FIGS. 12A-C represent a series of illustrations similar to those depicted in FIGS. 11A-C, but showing connection of three different sizes of 9×4 hook arms 310, 312, 314 to the connector 100. In this instance, the hook's interior pocket is engaged by the upper section of the profile 208 together with the support rail 228. A rearward 9×4 rest 322 also cooperates with the ends of the standard and long length 9×4 hook arms 314, 312 to provide stability. The elastic tongue 222 does not seat in a din slot in any of the 9×4 support arms 310-314. So to prevent unintended disassembly the 9×4 support arms are all captured behind the 9×4 stop 214. In order for the hooks 310-314 to pass the stops 214, the connector sides 210 must flare outwardly to create the necessary clearance for the hook arm 310, 312, 314 to pass. Once the hook arm 310, 312, 314 is seated against the profile 208, the sides 210 snap back into position thereby blocking unintended removal of the 9×4 hook arm from the connector 100. To accommodate flaring of the sides 210, the wiper assembly 20, 102 must be placed in a service up position.

Figure 13A:
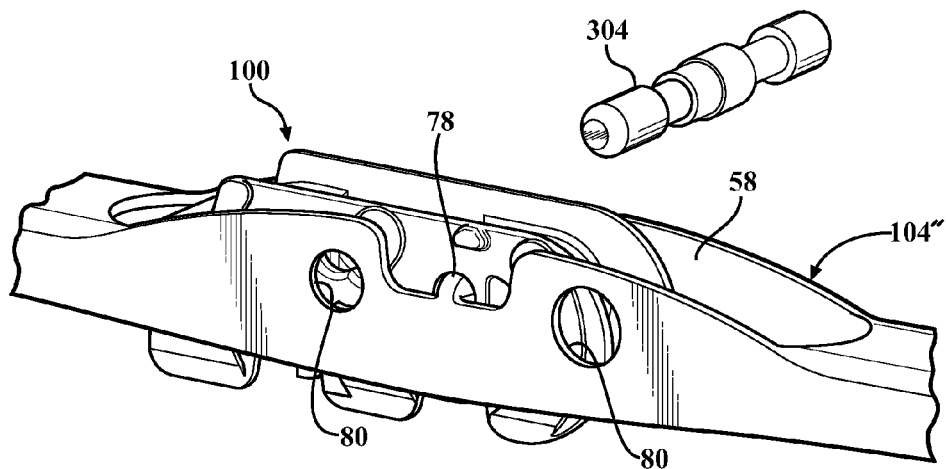
FIGS. 13A-13C illustrate connection of a 3⁄16" side pin arm to a wiper blade assembly utilizing the subject connector.
Figure 13B:
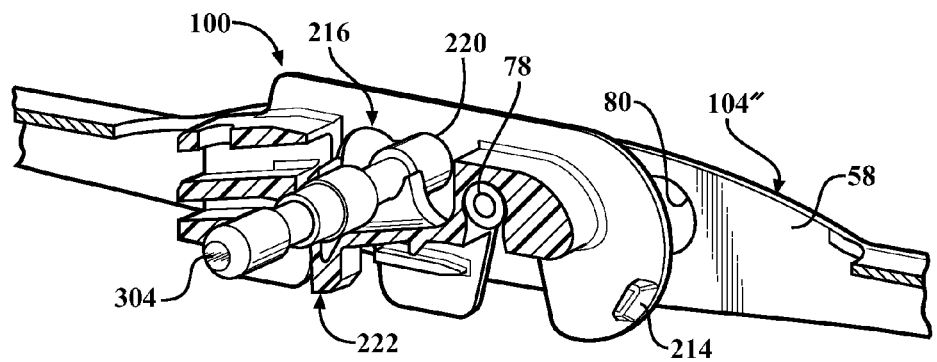
Figure 13C:
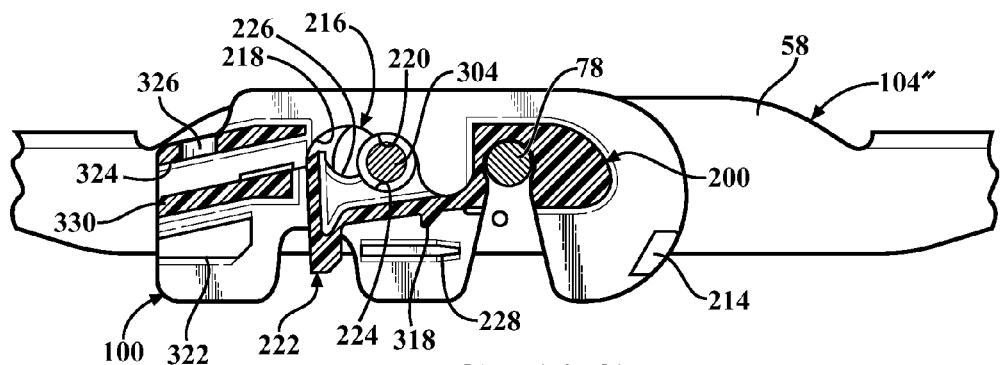

FIGS. 13A-C illustrate use of the subject connector 100 in connection with a ³⁄₁₆ inch side pin arm type arrangement 304. Here, the through-hole 80 provided in the bridge 104" is dimensioned so as to receive the ³⁄₁₆ inch side pin 304 extending laterally from the head of a wiper arm (not shown). Specially formed, overlapping lobes 218, 220 of the pin holes 216 have a figure-8 shape with one semicircular portion 220 being smaller and having a diameter to accommodate a ³⁄₁₆ inch side pin 304. A scalloped pawl 224 carried on the elastic tongue 222 is aligned with the small lobes 220 and adapted to engage the side pin 304 and seat in a groove formed therein so as to hold and retain the side pin 304 in an operative position. As shown in the fully assembled view in FIG. 13C, the connector 100 is locked in position when the side pin 304 is fully seated, such that collision with an external object like a rock or an ice scraper will not inadvertently disconnect the connector 100 from the side pin 304. This is due, in large part, to the fact that the side pin 304 is fully surrounded and enclosed by the connector 100. The connector 100 cannot be lifted out and removed from the bridge 104 unless and until the side pin 304 is removed.

Figure 14A:
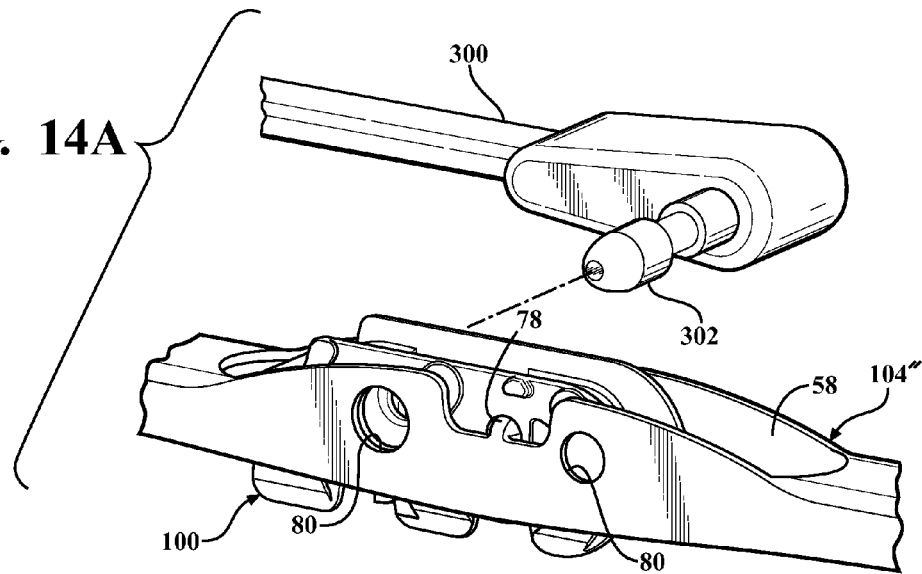
FIGS. 14A-14C depict connection of a ¼" size side pin arm to a wiper blade assembly using the subject connector.
Figure 14B:
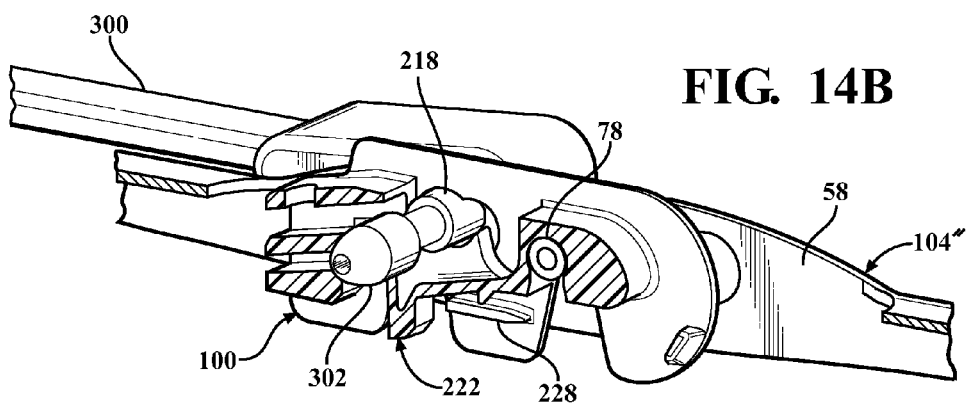
Figure 14C:
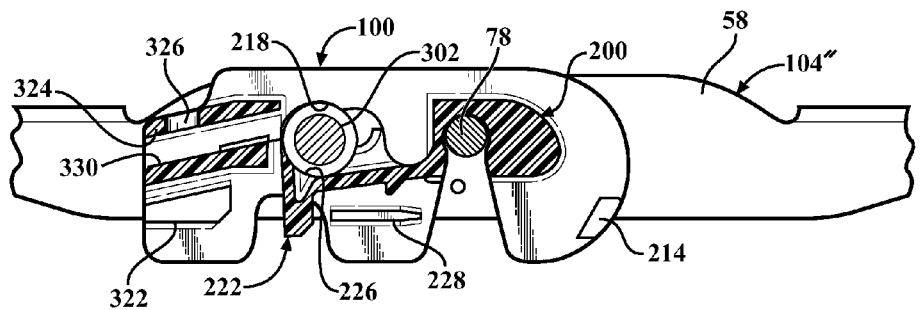

FIGS. 14A-C are views similar to those of FIGS. 13A-C, but showing how the connector 100 accommodates a larger, ¼ inch style side pin arm 302. As can be seen, operation is substantially similar to that described above in connection with the ³⁄₁₆ inch side pin 304, however the ¼ inch side pin 302 cooperates with the larger lobe 218 of the pin holes 216 and with a separate offset pawl 226 formed on the elastic tongue 222. Otherwise, all features and functionality correspond to that described above.

Figure 15A:
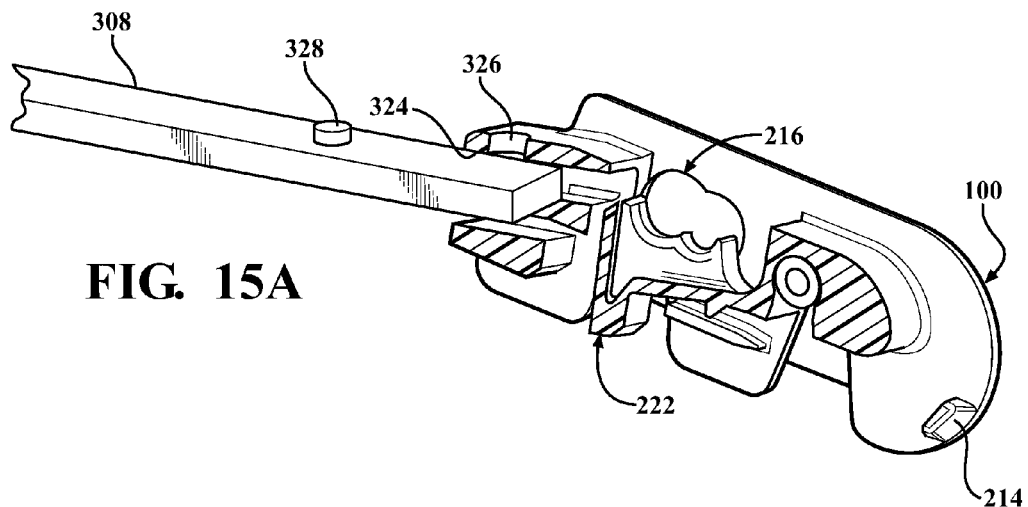
FIGS. 15A-15C illustrate connection of a straight end type wiper arm to a wiper blade assembly utilizing the subject connector.
Figure 15B:
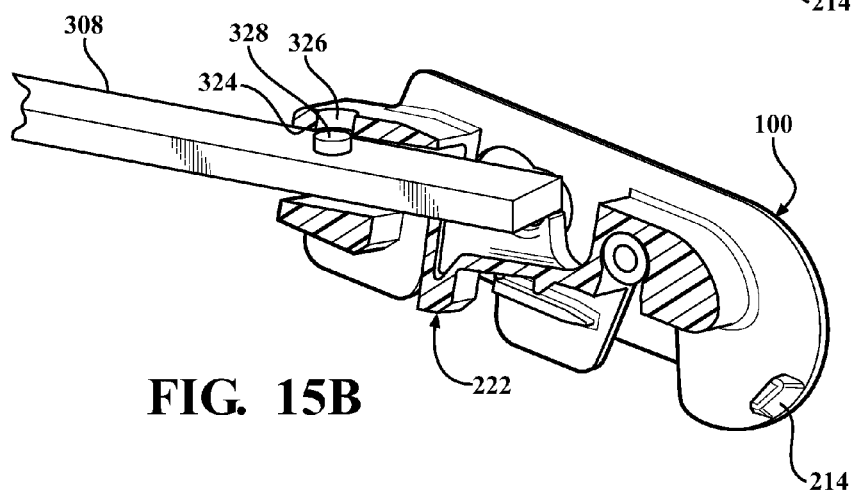
Figure 15C:
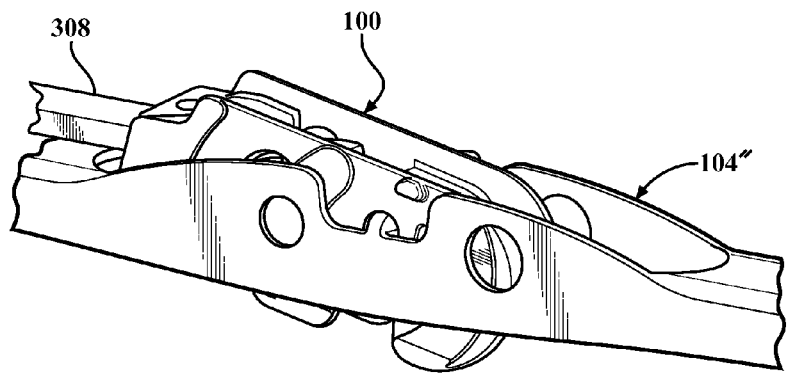

FIGS. 15A-C show connection of a straight end arm 308 to the subject connector 100 by insertion through a dedicated slot 324. A hole 326 formed in the upper portion of the slot 324 receives a stud 328 on the straight end arm 308 to capture it in position. The bottom surface 330 of the slot 324 is cantilevered to provide a spring-like member for installation and removal purposes.

The connector 100 of this invention provides a windshield wiper connection that will connect to 9×3 hooks 316, 9×4 hooks 310, 312, 314, ³⁄₁₆ inch side pin arms 304, ¼ inch side pin arms 302, and 7 mm straight end arms 308 without use of any additional adaptors, fillers, shims or parts. Thus, the one connector 100 of this invention can be used for both ³⁄₁₆ inch and ¼ inch side pin connections that have plastic that continues around the circumference of the installed side pin. This prevents blade disassembly from the vehicle if the connector is impacted by a foreign object. The subject connector 100 has a series of adjoining holes 216 that allows the insertion of either the 3/16 inch or 1/4 inch side pin. This design is achieved by an offset in the hole 216 alignment where the 3/16 inch and 1/4 inch side pins are inserted. The 3/16 side pin and 1/4 inch side pin are inserted into the bridge 104 of the blade assembly 102 and then through the connector 100. The holes 80 in the bridge 104 for the 3/16 inch and 1/4 inch side pin will align with one of the center points in the side pin holes 216 depending on the pin that will be inserted. As a result, the subject connector 100 allows the use of a single connector design to fit multiple configurations of wiper arm ends while maintaining a design that will not allow the pin type arms to become disengaged upon impact from a foreign object.

Furthermore, the subject connector 100 allows ease of connection for arms with a 9×3 hook 316 that do not have a service up position. This is accomplished by allowing the 9×3 hook 316 to be attached using the din hole 320 located on the bottom side of the hook 316. While the connection of the 9×4 hook 310, 312, 314 does not have engagement to the din hole 320, the 9×4 hook 310, 312, 314 connection point is on the front side of the hook 310, 312, 314 instead of its din hole. Rather, the 9×4 hooks 310, 312, 314 engage using two tabs (stops 214) located on the front side 210 of the connector 100. During the 9×3 hook 316 engagement, the 9×3 hook 316 bypasses the stops 214 by gliding over the top of these tabs 214 and then connects using a sharks tooth 318 located on the elastic tongue 222. Thus, there are two distinctly different connection techniques that are used for the 9×3 316 and 9×4 310, 312, 314 arm hooks.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A connector (100) for joining a wiper blade (20, 102) to any one of various style wiper arm ends (302, 304, 308, 310, 312, 314, 316), said connector (100) comprising:
    a central body section (200), said central body section (200) including a rivet-receiving socket (202), a generally planar upper landing (204), a generally planar lower return (206) and a forward nose profile (208) extending between said upper landing (204) and said lower return (206);
    a pair of sides (210) interconnected by said central body section (200) on respective inside faces thereof, said sides (210) including cantilevered extensions (212) projecting beyond said nose profile (208); a 9×4 stop (214) disposed on the inside face of the cantilevered extension (212) of at least one said side (210) and set below the plane of said lower return (206) by a clearance gap;
    each side (210) further including a transversely extending pin hole (216) adapted to receive wiper arm side pins (302, 304) of different diameters; and
    a flexible tongue (222) extending from said central body section (200) and disposed between said sides (210), said tongue (222) including at least one pawl (224, 226) disposed generally between said pin holes (216) for engaging a wiper arm side pin (302, 304) and a tooth (318) for engaging a din slot (320) recess in a wiper arm hook (316) wherein said pin hole (216) has a generally figure "8" shape defined by a larger lobe (218) and an overlapping smaller lobe (220).

2. The connector (100) of claim 1, wherein said clearance gap is greater than or equal to 3 mm and less than 4 mm.

3. The connector (100) of claim 1, wherein each said lobe (218, 220) has an inner circumference greater than 180 degrees.

4. The connector (100) of claim 1, wherein at least one of said sides (210) includes a 9×4 support rail (228) disposed on the inside face thereof and set below the plane of said lower return (206) by said clearance gap.

5. The connector (100) of claim 1, wherein said at least one pawl (224, 226) of said flexible tongue (222) comprises a pair of scalloped pawls (224, 226).

6. The connector (100) of claim 1, further including a rear 9×4 rest (322) spaced from said central body section (200) and interconnecting said sides (210).

7. The connector (100) of claim 1, further including a straight arm slot (324) spaced from said central body section (200) and interconnecting said sides (210).

8. A connector (100) for joining a wiper blade (20, 102) to any one of various style wiper arm ends (302, 304, 308, 310, 312, 314, 316), said connector (100) comprising:
    a central body section (200), said central body section (200) including a rivet-receiving socket (202), a generally planar upper landing (204), a generally planar lower return (206) and a forward nose profile (208) extending between said upper landing (204) and said lower return (206);
    a pair of sides (210) interconnected by said central body section (200) on respective inside faces thereof, said sides (210) including cantilevered extensions (212) projecting beyond said nose profile (208); a 9×4 stop (214) disposed on the inside face of the cantilevered extension (212) of at least one of said sides (210) and set below the plane of said lower return (206) by a clearance gap greater than or equal to 3 mm and less than 4 mm;
    each side (210) further including a pin hole (216) having a larger lobe (218) and an overlapping smaller lobe (220);
    at least one of said sides (210) including a 9×4 support rail (228) disposed on the inside face thereof and set below the plane of said lower return (206) by said clearance gap;
    a flexible tongue (222) extending from said central body section (200) and disposed between said sides (210), said tongue (222) including at least one pawl (224, 226) disposed generally between said pin holes (216) in said sides (210); said tongue (222) further including a tooth (318) opposite said at least one pawl (224, 226); and
    a rear 9×4 rest (322) spaced from said central body section (200 and interconnecting said sides (210), and a straight arm slot (324).

9. A wiper assembly (20, 102) for accommodating any one of various size side-pin style wiper arms (300, 302, 304, 306), said assembly comprising:
    a wiper blade (20, 102) including a wiping element (22) and a bridge portion (36, 54, 104), the bridge portion providing a point of connection to an oscillating wiper arm, the bridge portion including a pair of spaced-apart ears (58), a rivet (78) extending transversely between said ears (58), at least one through-hole (80) offset from said rivet (78) and extending in aligned fashion through said pair of ears (58);
    a wiper arm having a free swinging end, said free end including a transversely extending side pin (302, 304, 306);
    a connector (100) for interconnecting said bridge portion (36, 54, 104) of said wiper blade (20, 102) to said side pin (304, 302) of said wiper arm;

said connector (100) including a central body section (200) having a rivet-receiving socket (202) and a pair of sides (210) interconnected by said central body section (200) on respective inside faces thereof;

each side (210) including a transversely extending pin hole (216) adapted to receive wiper arm side pins (302, 304, 306) of different diameters; and said connector (100) further including a flexible tongue (222) extending from said central body section (200) and disposed between said sides (210), said tongue (222) including at least one pawl (224, 226) disposed generally between said pin holes (216) for engaging a wiper arm side pin (302, 304, 306) in locked engagement to be retained against disconnection from said wiper blade (20, 102) wherein said pin hole (216) has a generally figure "8" shape defined by a larger lobe (218) and an overlapping smaller lobe (220).

10. The wiper assembly (20, 102) of claim 1, wherein each said lobe (218, 200) has an inner circumference greater than 180 degrees.

11. The wiper assembly (20, 102) of claim 9, wherein at least one pawl (224, 226) of said flexible tongue (222) comprises a pair of scalloped pawls (224, 226).

12. The wiper assembly (20, 102) of claim 9, wherein said connector (100) further includes:

a generally planar upper landing (204), a generally planar lower return (206) and a forward nose profile (208) extending between said upper landing (204) and said lower return (206);

said connector (100) including a pair of sides (210) interconnected by said central body section (200) on respective inside faces thereof, said sides (210) including cantilevered extensions (212) projecting beyond said nose profile (208); a 9×4 stop (214) disposed on the inside face of the cantilevered extension (212) of at least one said side (210) and set below the plane of said lower return (206) by a clearance gap; and said tongue (222) including a tooth (318).

13. A wiper arm assembly (20, 102) for alternatively accommodating 9×3 (316) and 9×4 (310, 312, 314) hook style wiper arms, said assembly comprising:

a wiper blade (20, 102) including a wiping element (22) and a bridge portion (36, 54, 104), the bridge portion providing a point of connection to an oscillating wiper arm, the bridge portion including a pair of spaced-apart ears (58), a rivet (78) extending transversely between said ears (58), at least one through-hole (80) offset from said rivet and extending in aligned fashion through said pair of ears (58);

a wiper arm having a free swinging end, said free end including a hook formation (310, 312, 314, 316) comprising either a smaller 9×3 style (316) or a larger 9×4 style (310, 312, 314);

a connector (100) for interconnecting said bridge portion (36, 54, 104) of said wiper blade (20, 102) to said hook formation (310, 312, 314, 316) of said wiper arm;

said connector (100) including a central body section (200), said central body section (200) including a rivet-receiving socket (202), a generally planar upper landing (204), a generally planar lower return (206) and a forward nose profile (208) extending between said upper landing and said lower return (206);

said connector (100) including a pair of sides (210) interconnected by said central body section (200) on respective inside faces thereof, said sides (210) including cantilevered extensions (212) projecting beyond said nose profile (208); a 9×4 stop (214) disposed on the inside face of the cantilevered extension (212) of at least one said side (210) and set below the plane of said lower return (206) by a clearance gap; and a flexible tongue (222) extending from said central body section (200) and disposed between said sides (210), said tongue (222) including a tooth (318) for engaging a din slot recess (320) in said 9×3 wiper arm hook (316) each side (210) further including a transversely extending pin hole (216) adapted to receive wiper arm side pins (302, 304) of different diameters; wherein said pin hole (216) has a generally figure "8" shape defined by a larger lobe (218) and an overlapping smaller lobe (220).

14. The wiper assembly (20, 102) of claim 13, wherein said clearance gap is greater than or equal to 3 mm and less than 4 mm.

15. The wiper assembly (20, 102) of claim 13, wherein at least one of said sides (210) includes a 9×4 support rail (228) disposed on the inside face thereof and set below the plane of said lower return (206) by said clearance gap.

16. The wiper assembly (20, 102) of claim 13, further including a rear 9×4 rest (322) spaced from said central body (200) section and interconnecting said sides (210).

17. The wiper assembly (20, 102) of claim 13, further including a straight arm slot (324).

18. The wiper assembly (20, 102) of claim 13, wherein said connector (100) further includes a transversely extending pin hole (216) in each said side (210) adapted to receive wiper arm side pins (302, 304, 306) of different diameters; and said flexible tongue (222) includes at least one pawl (224, 226) disposed generally between said pin holes (216).

* * * * *

UNITED STATES PATENT AND TRADEMARK OFFICE
CERTIFICATE OF CORRECTION

PATENT NO. : 8,341,799 B2
APPLICATION NO. : 12/832134
DATED : January 1, 2013
INVENTOR(S) : Koppen et al.

It is certified that error appears in the above-identified patent and that said Letters Patent is hereby corrected as shown below:

Column 9, Line 18 "of claim 1" should read "of claim 9"

Signed and Sealed this
Nineteenth Day of March, 2013

Teresa Stanek Rea
*Acting Director of the United States Patent and Trademark Office*